(12) United States Patent
Cheng et al.

(10) Patent No.: US 11,493,835 B2
(45) Date of Patent: Nov. 8, 2022

(54) ELEVATING MECHANISM AND ELECTRONIC DEVICE

(71) Applicant: WISTRON CORP., New Taipei (TW)

(72) Inventors: Guangguo Cheng, New Taipei (TW); Ai Xu, New Taipei (TW); Yougang Wang, New Taipei (TW); Chih Chou Chou, New Taipei (TW)

(73) Assignee: WISTRON CORP., New Taipei (TW)

( * ) Notice: Subject to any disclaimer, the term of this patent is extended or adjusted under 35 U.S.C. 154(b) by 21 days.

(21) Appl. No.: 17/342,591

(22) Filed: Jun. 9, 2021

(65) Prior Publication Data

US 2022/0308425 A1 Sep. 29, 2022

(30) Foreign Application Priority Data

Mar. 29, 2021 (CN) .......................... 202110335516.1

(51) Int. Cl.
| | | |
|---|---|---|
| *G03B 17/56* | (2021.01) | |
| *F16M 13/02* | (2006.01) | |
| *F16M 11/26* | (2006.01) | |
| *F16M 11/20* | (2006.01) | |

(52) U.S. Cl.
CPC ....... *G03B 17/561* (2013.01); *F16M 11/2021* (2013.01); *F16M 11/26* (2013.01); *F16M 13/022* (2013.01); *F16M 2200/028* (2013.01)

(58) Field of Classification Search
CPC .. G03B 17/561; F16M 11/2021; F16M 11/26; F16M 13/022
See application file for complete search history.

(56) References Cited

U.S. PATENT DOCUMENTS

2022/0121090 A1* 4/2022 Zhang .................... G03B 15/00

FOREIGN PATENT DOCUMENTS

TW   I739668 B   9/2021

OTHER PUBLICATIONS

TW Office Action dated Dec. 27, 2021 in Taiwan application No. 110114381.

* cited by examiner

*Primary Examiner* — Minh Q Phan
(74) *Attorney, Agent, or Firm* — McClure, Qualey & Rodack, LLP

(57) ABSTRACT

An elevating mechanism adapted to accommodate a function unit and including main frame, elevating frame, and accommodation frame. The main frame has first guide portion including straight portion and non-straight portion. The elevating frame is movably disposed on the main frame. The accommodation frame is pivotably connected to the elevating frame and has second guide portion slidably located at the first guide portion. When the accommodation frame is in non-inclined position, the second guide portion is located at the straight portion. When the accommodation frame is in inclined position, the second guide portion is located at the non-straight portion and the accommodation frame is inclined with respect to the main frame.

20 Claims, 13 Drawing Sheets

ELEVATING MECHANISM AND ELECTRONIC DEVICE

CROSS-REFERENCE TO RELATED APPLICATIONS

This non-provisional application claims priority under 35 U.S.C. § 119(a) on Patent Application No(s). 202110335516.1 filed in China on Mar. 29, 2021, the entire contents of which are hereby incorporated by reference.

TECHNICAL FIELD

The disclosure relates to an elevating mechanism, more particularly to an elevating mechanism having a function unit arranged therein and an electronic device having the same.

BACKGROUND

In recent years, video cameras have been widely used in video conferences, live broadcasts, remote video teaching, and other occasions, thus they become an indispensable part of computers or TV screens and have gradually changed people's work and lifestyle.

Typically, the camera lens is arranged in the front bezel of a TV, computer, tablet, or smartphone screen and receives light via a punch-hole on the front bezel. To do so, the front bezel is needed to spare a wide portion to make space for the camera module even if the volume of the camera module is continuously reduced, making the product difficult to achieve an extremely thin bezel.

SUMMARY

Accordingly, the present disclosure provides an elevating mechanism and an electronic device having the same that provide a mechanism to support pop-up camera function, such that the camera can be arranged behind the screen so as to achieve an edge-to-edge front screen display.

One embodiment of the disclosure provides an elevating mechanism adapted to accommodate a function unit and including a main frame, an elevating frame, and an accommodation frame. The main frame has at least one first guide portion including a straight portion and a non-straight portion connected to each other. The elevating frame is movably disposed on the main frame. A movable direction of the elevating frame is substantially parallel to the straight portion. The accommodation frame is configured to accommodate the function unit. The accommodation frame is pivotably connected to the elevating frame and has at least one second guide portion slidably located at the at least one first guide portion to make the accommodation frame movable between a non-inclined position and an inclined position. When the accommodation frame is in the non-inclined position, the at least one second guide portion is located at the straight portion of the at least one first guide portion. When the accommodation frame is in the inclined position, the at least one second guide portion is located at the non-straight portion of the at least one first guide portion and the accommodation frame is inclined with respect to the main frame.

Another embodiment of the disclosure provides an electronic device including a casing, an elevating mechanism, and a function unit. The elevating mechanism is accommodated in the casing and includes a main frame, an elevating frame, and an accommodation frame. The main frame is fixed to the casing and has at least one first guide portion. The at least one first guide portion includes a straight portion and a non-straight portion connected to each other. The elevating frame is movably disposed on the main frame. A movable direction of the elevating frame is substantially parallel to the straight portion. The accommodation frame is pivotably connected to the elevating frame and has at least one second guide portion. The at least one second guide portion is slidably located at the at least one first guide portion to make the accommodation frame movable between a non-inclined position and an inclined position. When the accommodation frame is in the non-inclined position, the at least one second guide portion is located at the straight portion of the at least one first guide portion. When the accommodation frame is in the inclined position, the at least one second guide portion is located at the non-straight portion of the at least one first guide portion and the accommodation frame is inclined with respect to the main frame. The function unit is accommodated in the accommodation frame.

According to the elevating mechanism and the electronic device as discussed in the above embodiments of the disclosure, the elevating frame is slidable with respect to the main frame and the accommodation frame is pivotable to a specific angle with respect to the main frame during the elevation of the elevating frame, thus when the elevating mechanism is applied to a screen of TV, computer, tablet, or mobile phone, the elevating mechanism achieves a pop-up camera function so that the camera is allowed to be arranged behind or under the screen. As such, the function unit (e.g., lens module) can be elevated and directed to a specific angle or hidden behind the screen. And since the lens module is moved behind the screen, there is no need to accommodate the lens module in the front bezel so the front bezel can be extremely narrowed to achieve a high screen-to-body ratio as possible, thereby creating a nearly edge-to-edge front screen display while offering a convenient and automatic operation.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1A:
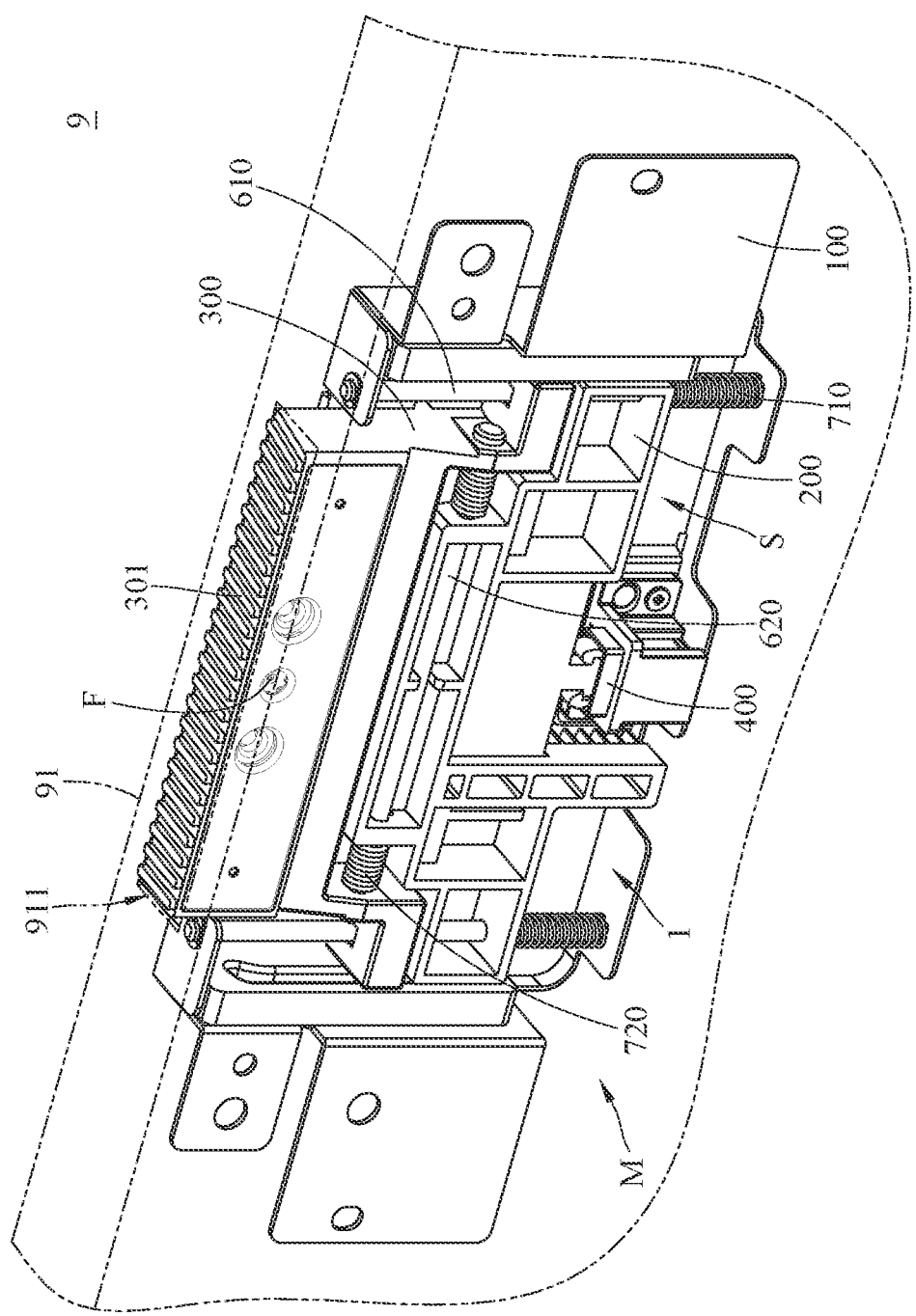
FIGS. 1A-1B are partially enlarged perspective views of an electronic device having an elevating mechanism according to one embodiment of the disclosure taken from different view angles.

In the following detailed description, for purposes of explanation, numerous specific details are set forth in order to provide a thorough understanding of the disclosed embodiments. It will be apparent, however, that one or more embodiments may be practiced without these specific details.

The following embodiments will be described with reference to the drawings. For the purpose of clear illustration, some conventional elements and components may be illustrated in a simple and clear manner. Some of the features in the drawings may be slightly exaggerated or illustrated in a larger proportion for the ease of viewing but are not intended to limit the disclosure. In addition, for the same reason, some of the elements or components in the drawings may be illustrated in dotted lines.

Herein, the terms, such as "end", "part", "portion", "area", may be used to refer to specific features of or between elements or components but are not intended to limit the elements and components. In addition, the terms, such as "substantially" and "approximately", as used herein may mean a reasonable amount of deviation of the described term such that the end result is not significantly changed.

Further, unless explicitly stated, the term "at least one" as used herein may mean that the quantity of the described element or component is one or larger than one but does not necessarily mean that the quantity is only one. The term "and/or" may be used herein to indicate that either or both of two stated possibilities.

Figure 1B:
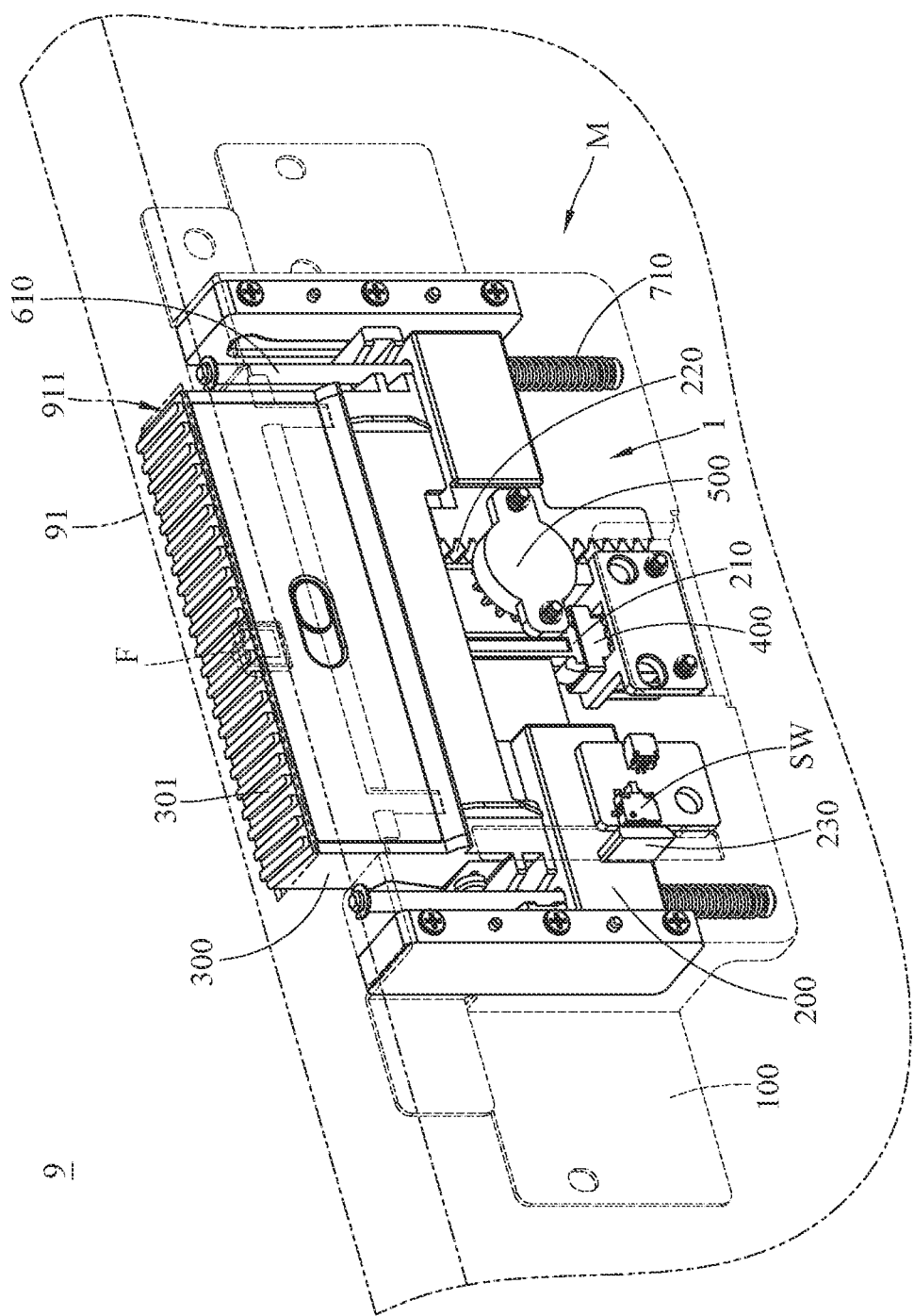

Firstly, referring to FIGS. 1A-1B, one embodiment of the disclosure provides an electronic device 9 having an elevating mechanism 1. For the purpose of simplicity and clarity, only a part of the electronic device 9 is shown, and a casing 91 of the electronic device 9 is depicted in broken lines. The electronic device 9 is, for example, a TV, computer screen, smartphone, or projector, but the type and application of the electronic device 9 is exemplary for better understanding the elevating mechanism 1. The elevating mechanism 1 can be hidden in the casing 91 and only has one surface exposed. As shown, an accommodation frame 300 of the elevating mechanism 1 has a top surface 301 exposed by an opening 911 of the casing 91. Also, the elevating mechanism 1 is able to be popped out of the opening 911 by being pushed.

In addition, in this embodiment, the elevating mechanism 1 may accommodate a function unit F therein, and the function unit F is arranged within the casing 91 via the accommodation frame 300 of the elevating mechanism 1 and can be popped out from the casing 91 by being driven by the elevating mechanism 1. The function unit F is a sensing device, such as a sound receiving module, an IR sensor, or a video camera module, that can form a sensing module M with the elevating mechanism 1, but the disclosure is not limited thereto.

Figure 2A:
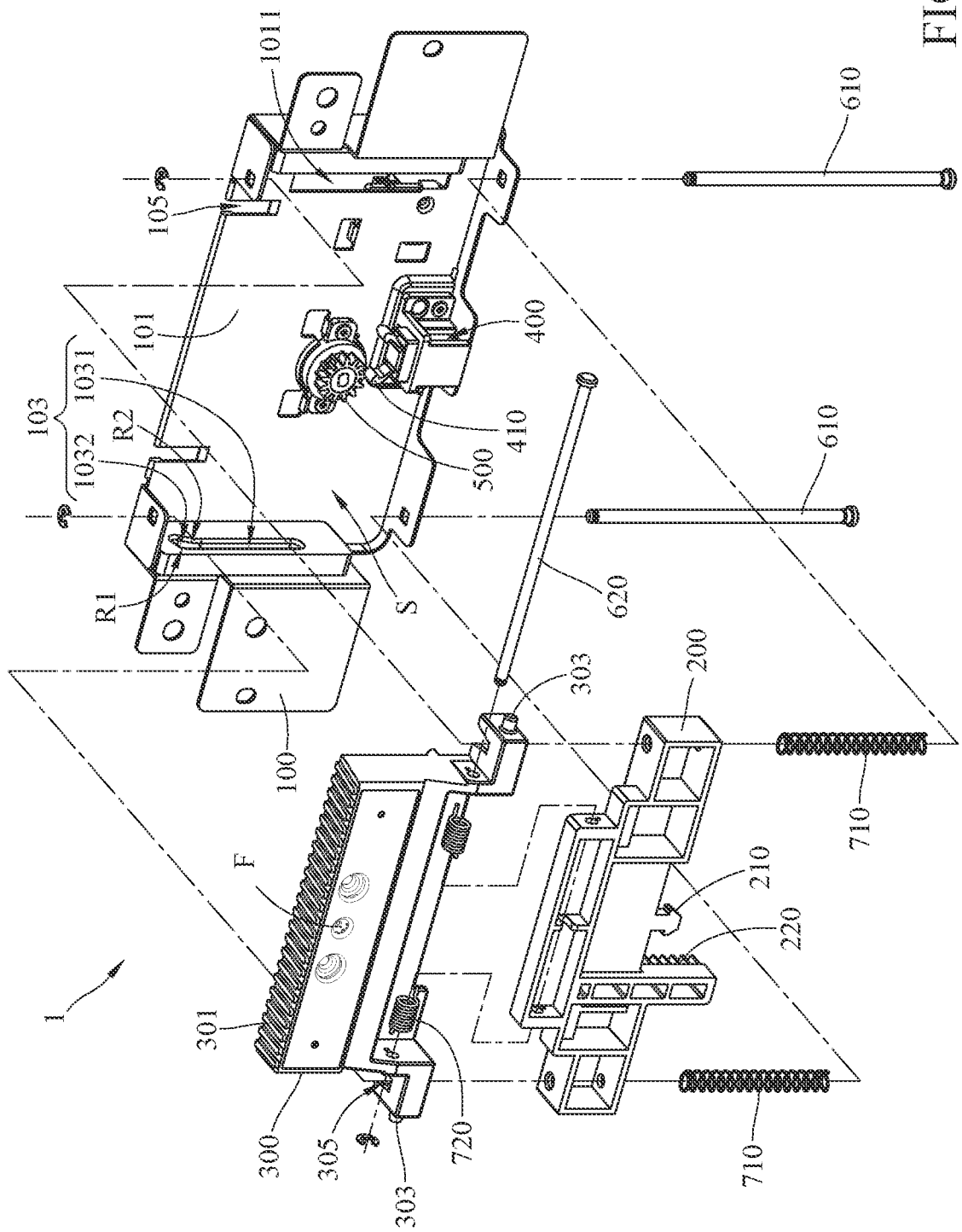
FIGS. 2A-2B are exploded views of the elevating mechanism in FIG. 1A taken from different view angles.
Figure 2B:
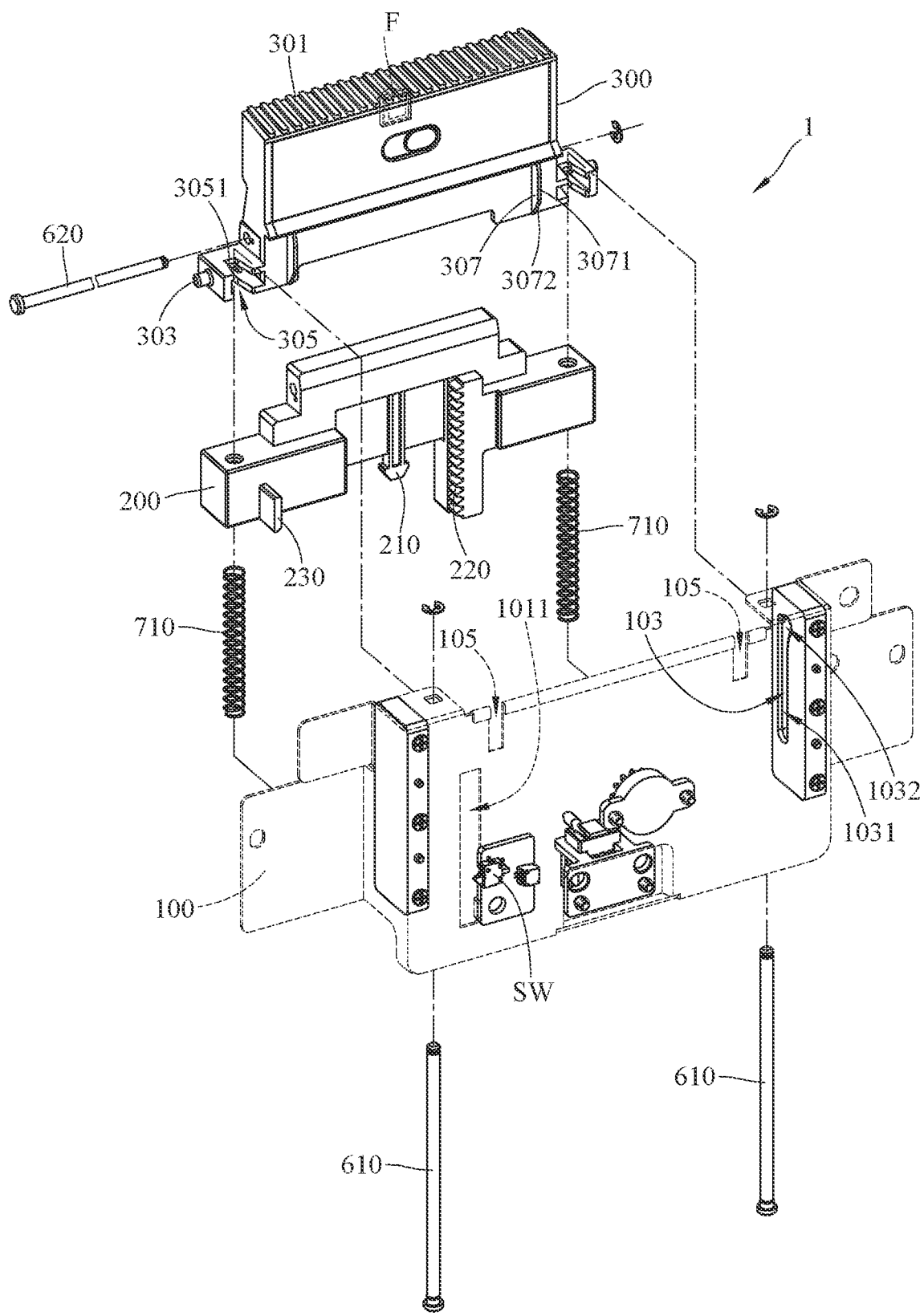
Figure 3A:
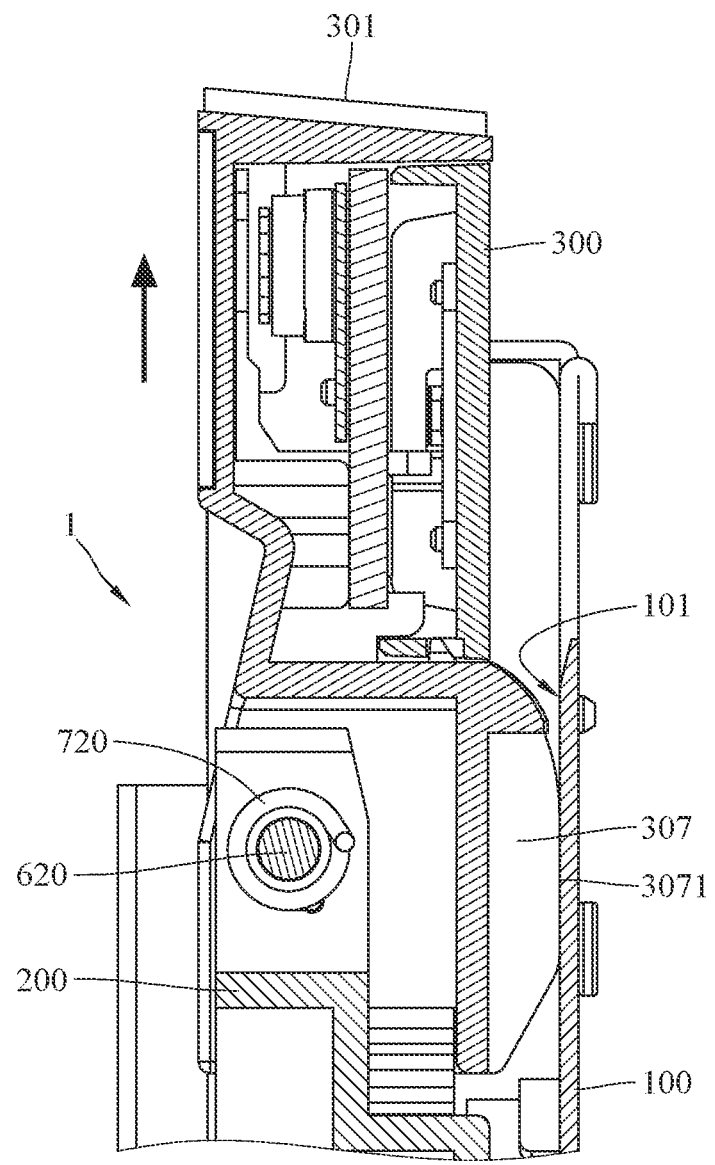
FIGS. 3A-3B are partially enlarged cross-sectional views of the elevating mechanism in FIG. 1A, taken from different cross-sections, as the elevating frame is just released.
Figure 3B:
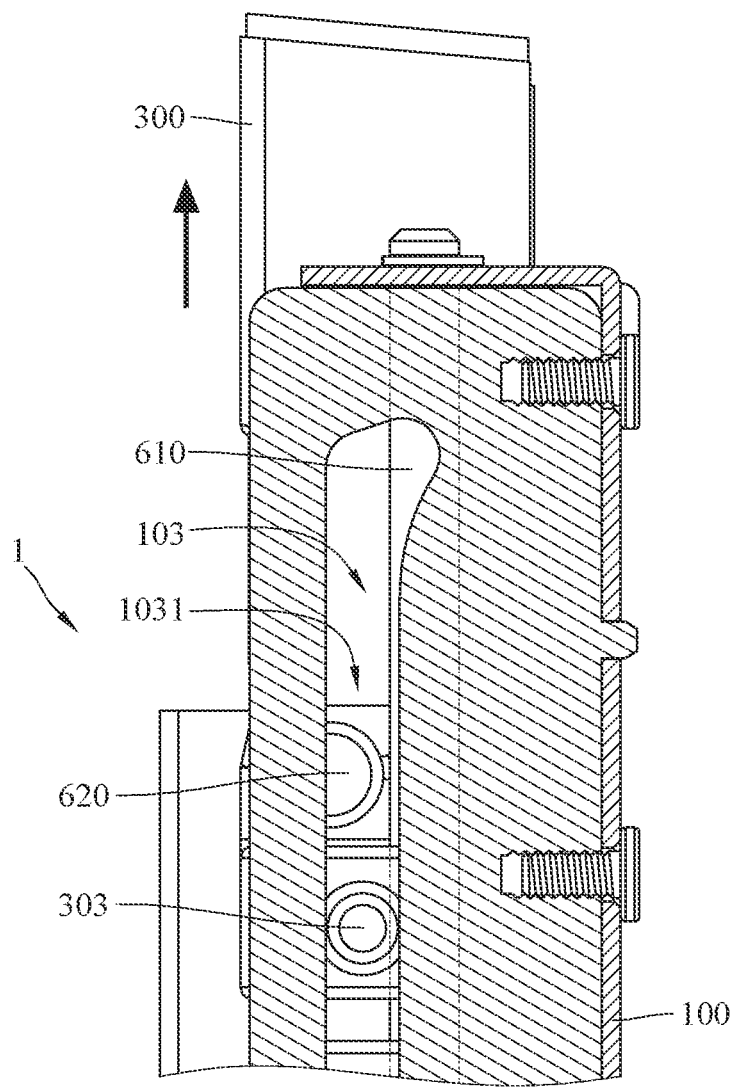
Figure 4A:
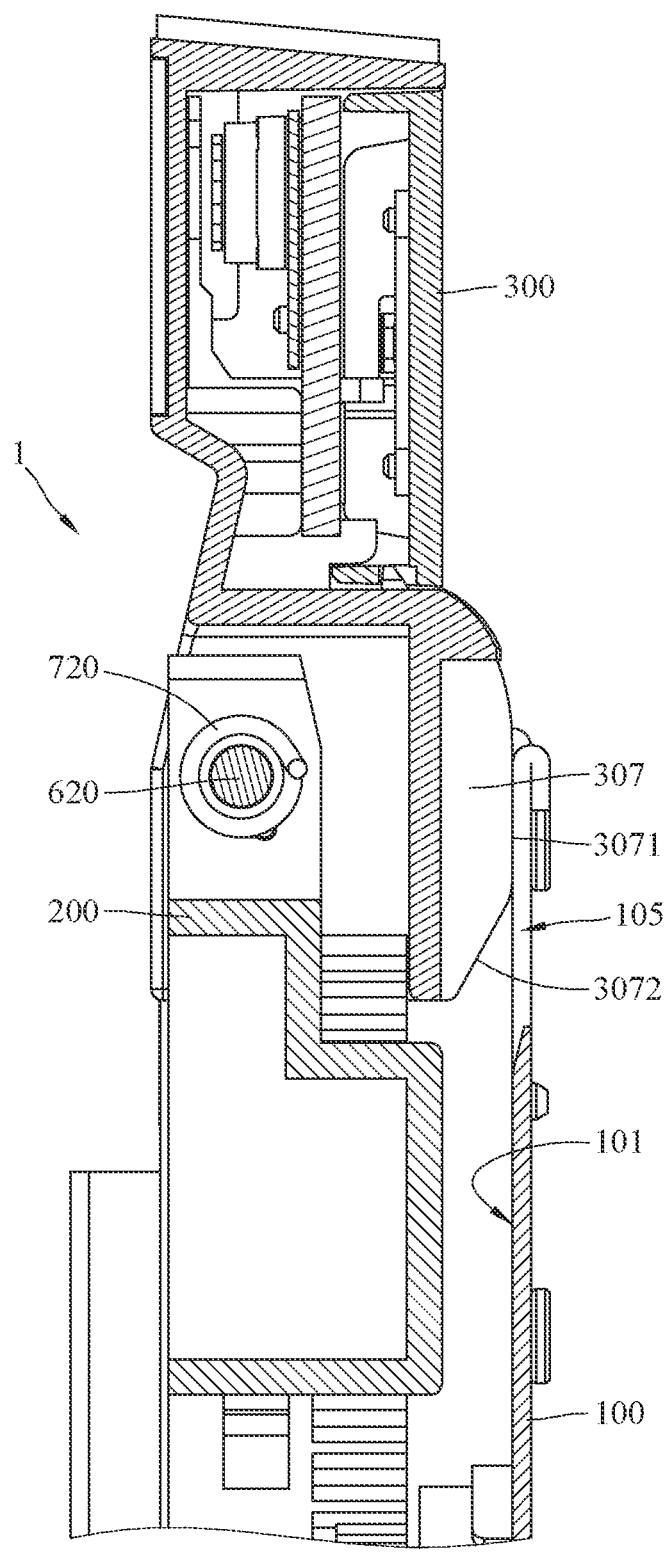
FIGS. 4A-4C are partially enlarged cross-sectional views of the elevating mechanism in FIG. 1A, taken from different cross-sections, as the elevating frame reaches the stopped status.
Figure 4B:
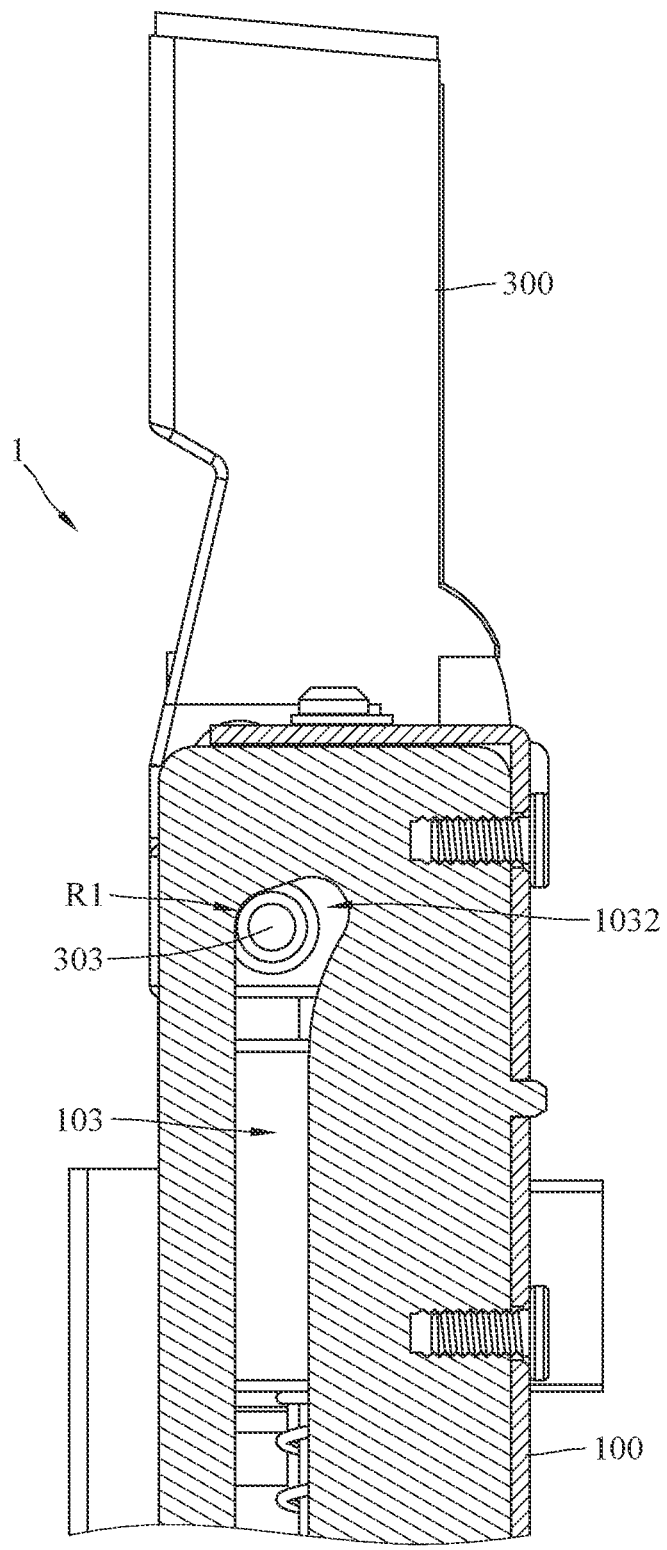
Figure 4C:
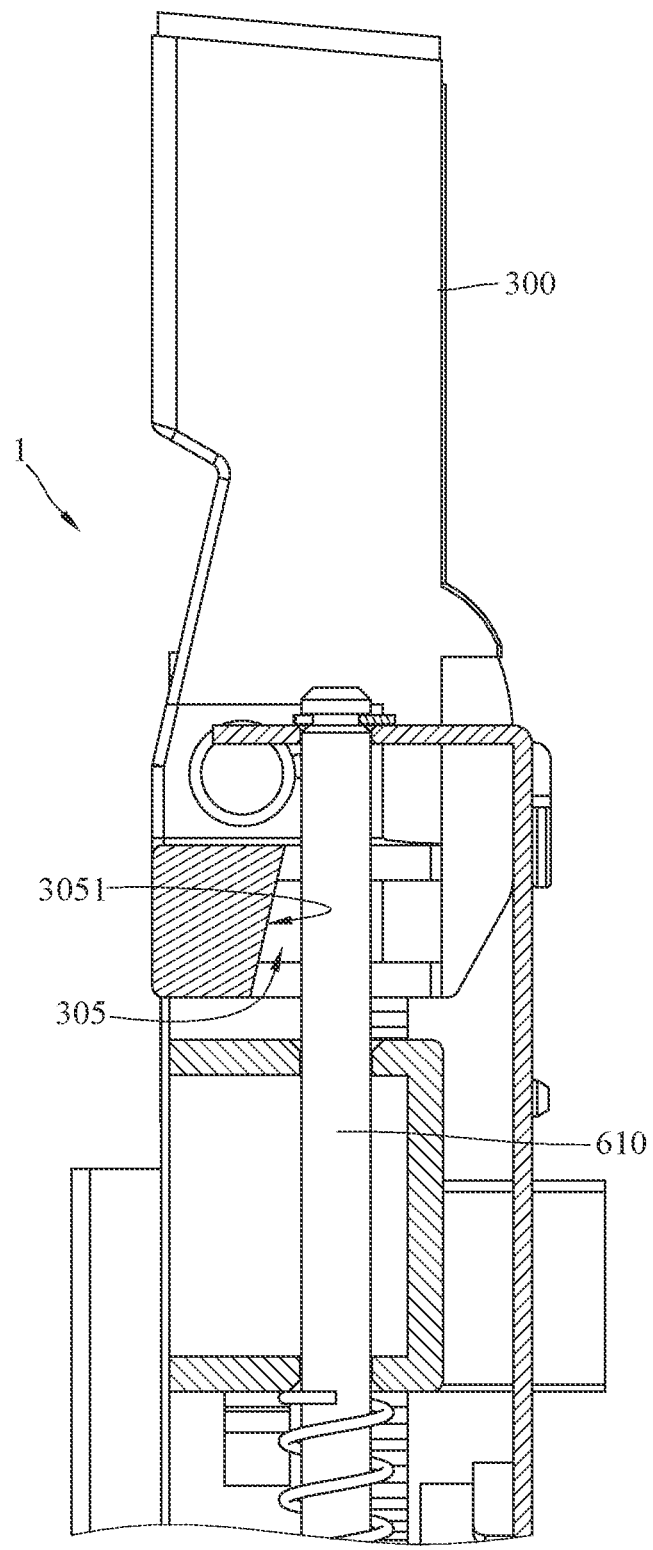
Figure 5A:
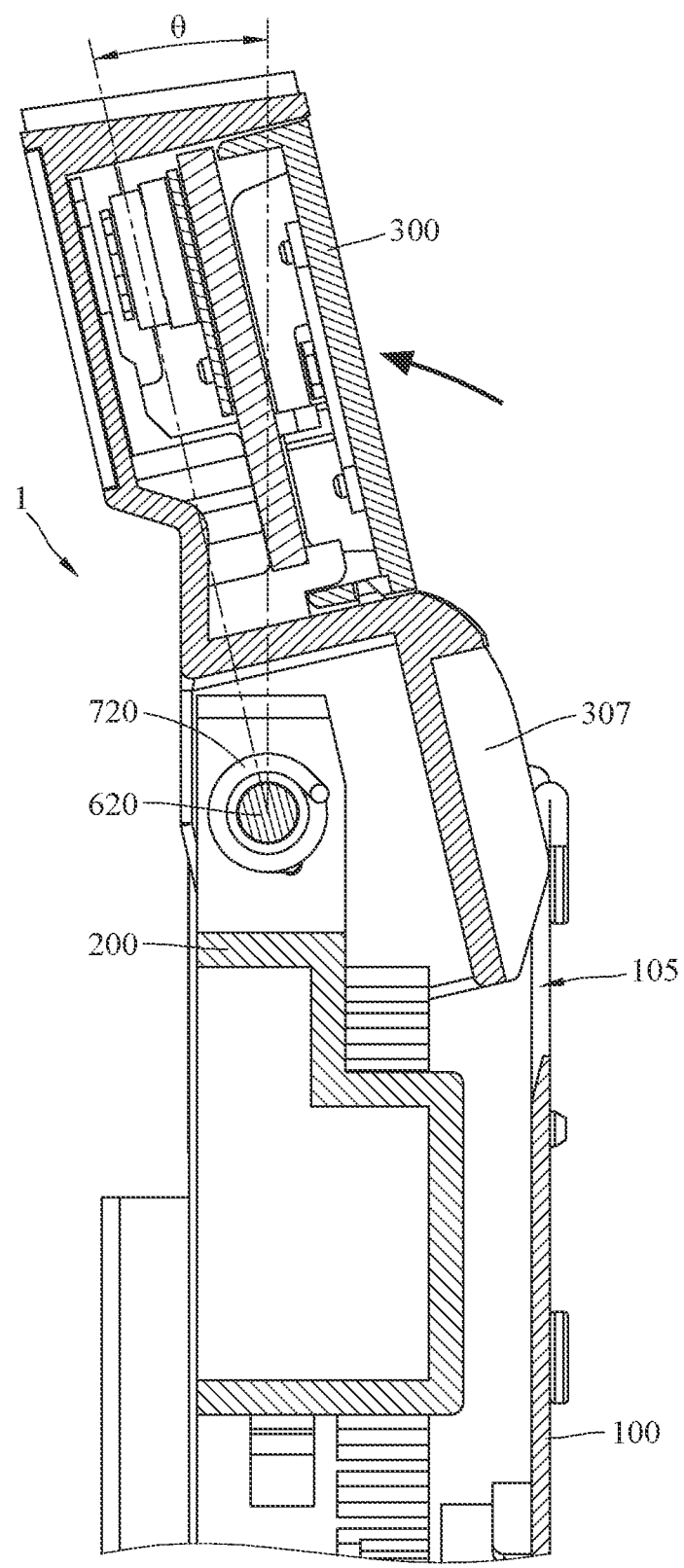
FIGS. 5A-5C are partially enlarged cross-sectional views of the elevating mechanism in FIG. 1A, taken from different cross-sections, when the elevating frame is in the stopped status and the accommodation frame is switched to the inclined position.
Figure 5B:
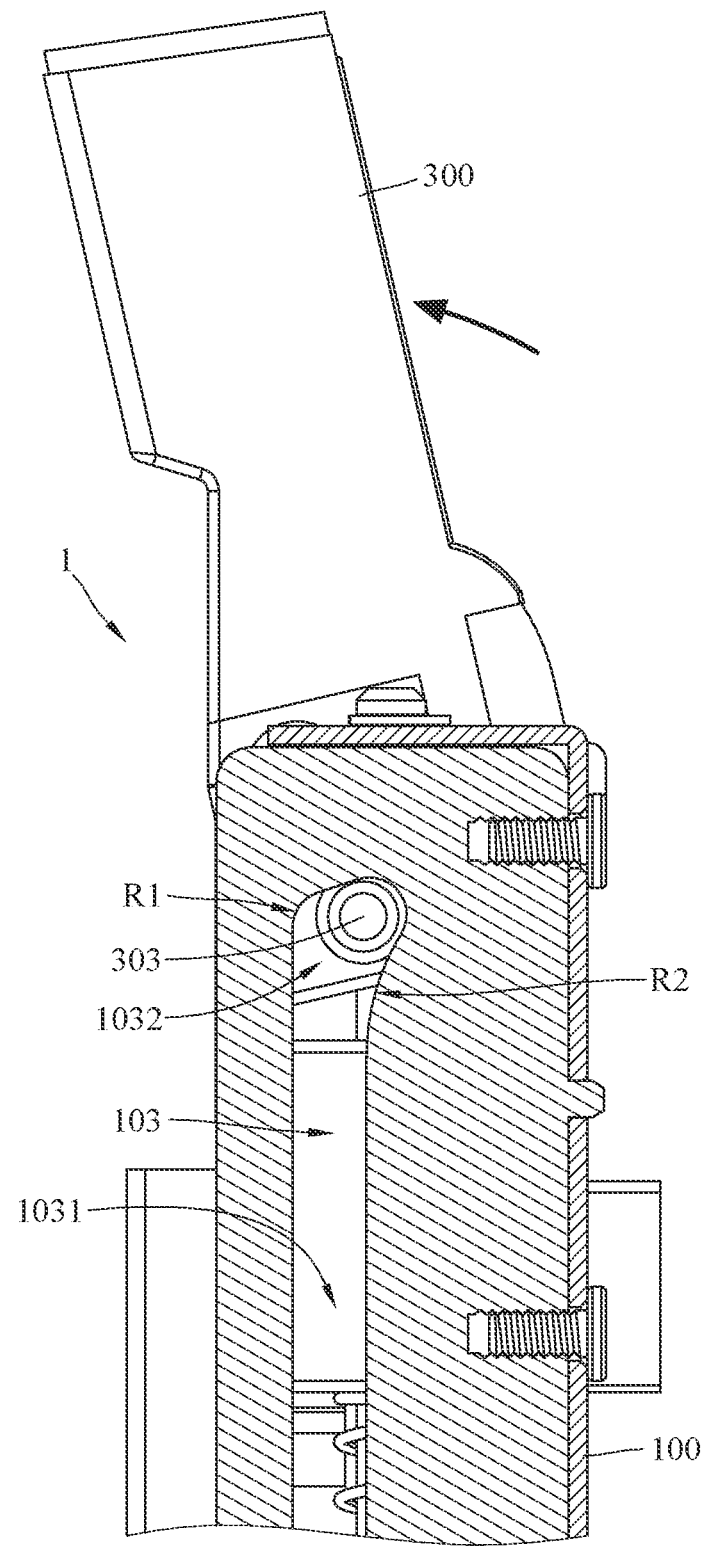
Figure 5C:
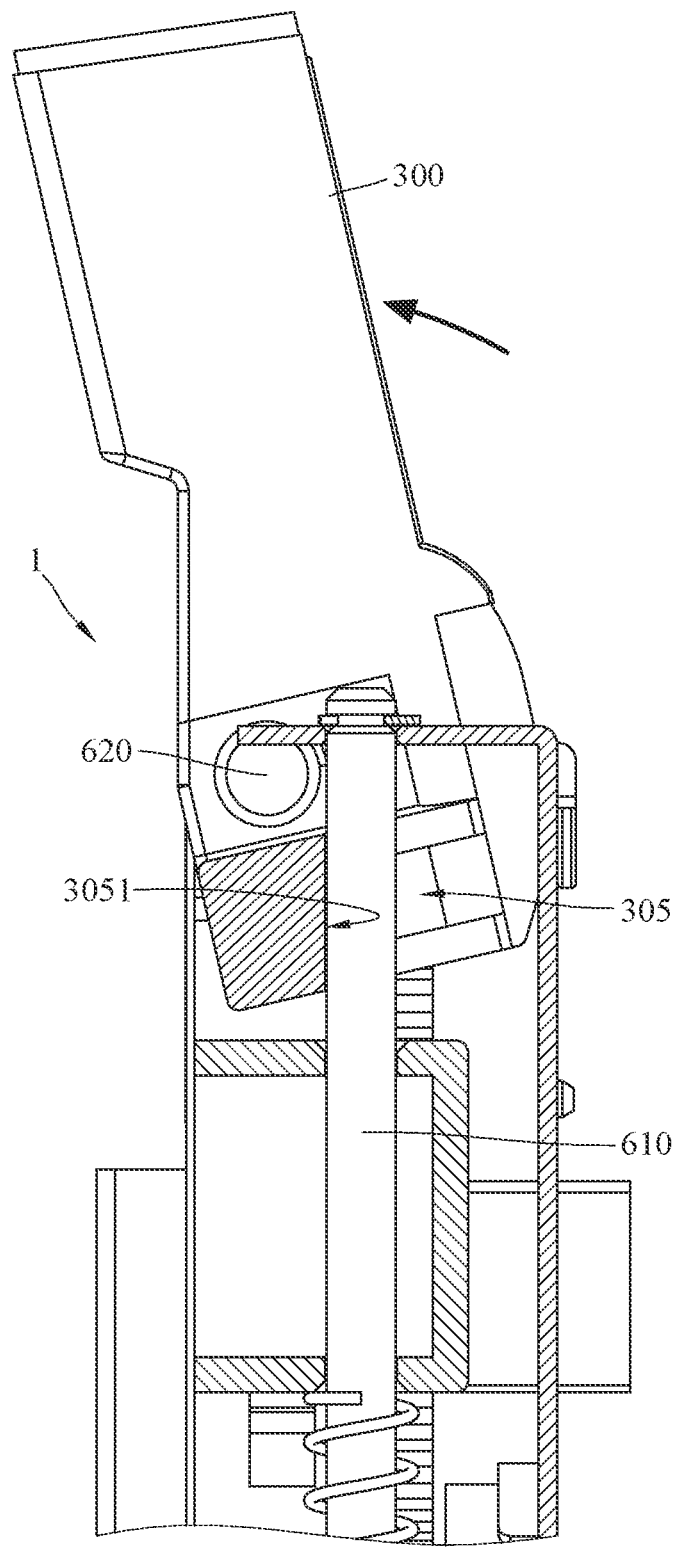

Please further refer to FIGS. 2A-2B, more details of the elevating mechanism 1 are provided hereinafter. In this embodiment, the elevating mechanism 1 may include a main frame 100, an elevating frame 200 and an accommodation frame 300. The main frame 100 is served to fix the elevating mechanism 1 to the casing 91. The elevating frame 200 is slidably disposed on the main frame 100 so is switchable among an engaged status (as shown in FIG. 1A or FIG. 1B), a slidable status (as shown in FIGS. 3A-3B), and a stopped status (as shown in FIGS. 4A-4C). When the elevating frame 200 is in the engaged status, the elevating frame 200 is fixed in the current position by a latching device 400 on the main frame 100. When the elevating frame 200 is released from the latching device 400, the elevating frame 200 is switched to the slidable status and becomes slidable in a specific direction with respect to the main frame 100. And the elevating frame 200 reaches the stopped status after it slides a predetermined distance. The accommodation frame 300 is pivotably disposed on the elevating frame 200 and slidably connected to the main frame 100 so that the accommodation frame 300 is movable along with the elevating frame 200 and therefore switchable between a non-inclined position (as shown in FIG. 1A or FIG. 1B) with respect to the main frame 100. When the elevating frame 200 reaches the stopped status, the accommodation frame 300 is inclined to an inclined position (as shown in FIGS. 5A-5C), but before the elevating frame 200 reaches the stopped status, the accommodation frame 300 is not allowed to rotate.

In more detail, the main frame 100 may be, but not limited to, made of metal or other suitable material, and may be secured to the casing 91 via screws, rivets, or other suitable fasteners. In this embodiment, the main frame 100 may be made by bending a metal plate, the main frame 100 define an accommodation space S to accommodate the elevating frame 200, the accommodation frame 300, and other associated components. In addition, the main frame 100 may have an inner surface 101 and at least one first guide portion 103, the inner surface 101 and the first guide portions 103 form and are located at different sides of the accommodation space S, where the inner surface 101 is located between the first guide portions 103 and therefore is able to guide the elevating frame 200, and the first guide portion 103 is configured to guide the accommodation frame 300.

In more detail, each of the first guide portions 103 is a groove having a straight portion 1031 and a non-straight portion 1032 connected to each other. The straight portion 1031 is a straight groove, and the non-straight portion 1032 extends outwards from the straight portion 1031 and is at an angle to the straight portion 1031. As shown, the non-straight portion 1032 is a curved groove extending from the straight portion 1031, R1 denotes an outer transitional surface between the non-straight portion 1032 and the straight portion 1031, and R2 denotes an inner transitional surface between the non-straight portion 1032 and the straight portion 1031. The outer transitional surface R1 and the inner transitional surface R1 have a suitable and mild curvature to connect the straight portion 1031 and the non-straight portion 1032 to each other.

The elevating frame 200 is slidably disposed on the main frame 100 via guiding structures. Specifically, in this embodiment, the elevating mechanism 1 may further include at least one guide rod 610 located in the accommodation space S and fixed to the main frame 100, the guide rods 610 are respectively located adjacent to the first guide portions 103 and are substantially parallel to the inner surface 101 of the main frame 100. The guide rods 610 are disposed through the elevating frame 200 so that the elevating frame 200 is only permitted to slide along the guide rods 610 with respect to the inner surface 101; in other words, the elevating frame 200 is only allowed to move along the extension direction of the guide rod 610.

In addition, the elevating frame 200 may have a push pin 210 configured to be engaged with the latching device 400 to secure the elevating frame 200 in the engaged status. Specifically, the latching device 400 is, but not limited to, a typical push latch mechanism that provides a "push to close"

and "push to open" latching mechanism. As shown, the latching device 400 may have a latch 410 protruding outwards to receive the push pin 210 of the elevating frame 200, the push pin 210 may be a block having an arrow shape or hooks at its distal end and therefore can be removably inserted into the latching device 400 to be engaged with the latch 410. Pushing the push pin 210 into the latch 410 can make the latch 410 close and engage with the push pin 210 so as to fix the elevating frame 200 to the latching device 400, securing the engaged status of the elevating frame 200.

In addition, to achieve the "push to open" function of the push pin 210, in this embodiment, the elevating mechanism 1 may further include at least one first elastic component 710. Specifically, the first elastic components 710 may be, but not limited to, compression springs respectively sleeved on the guide rods 610 and each of them is connected between the main frame 100 and the elevating frame 200 so as to force the elevating frame 200 to move towards the slidable status and the stopped status. As such, when the push pin 210 is further pushed toward the latching device 400 to be disengaged from the latch 410, the first elastic components 710 immediately push the elevating frame 200 and the push pin 210 away from the latch 410. When the push pin 210 is pushed to be released, the elevating frame 200 is switched to the slidable status by being pushed by the first elastic component 710. It is noted that any suitable means that can provide a "push to close" and "push to open" latching function can be employed as the latching device of the disclosure.

Further, to stabilize the motion of the elevating frame 200 on the main frame 100, in this embodiment, the elevating mechanism 1 may further include a damper 500, and the elevating frame 200 may further include a gear rack portion 220. Specifically, the damper 500 is, but not limited to, a typical damper gear having a gear (not numbered) rotatably disposed on the inner surface 101 of the main frame 100 and engaged with the gear rack portion 220 of the elevating frame 200 so as to ensure a more controlled, gentle and smooth motion of the elevating frame 200 during the slidable status. Note that the damper 500 is optional; in some other embodiments, the elevating mechanism may not have the aforementioned damper, and the elevating frame may omit the aforementioned gear rack portion.

In addition, in order to convert the mechanical movement of the elevating mechanism 1 into electrical signals for the use by external or associated mechanism, in this embodiment, the elevating mechanism 1 may further include a switch SW, and the elevating frame 200 may further include a protrusion 230, the switch SW may be disposed on the other surface of the main frame 100 (opposite to the inner surface 101), the switch SW is exposed by a through hole 1011 of the inner surface 101, the protrusion 230 is slidably located at the through hole 1011. When the elevating frame 200 is in the engaged status, the protrusion 230 presses and activates the switch SW, and the switch SW transmits related signal to a predetermined receiver (not shown). Note that the switch SW is optional; in some other embodiments, the elevating mechanism may not have the aforementioned switch, and the elevating frame may omit the aforementioned protrusion.

The accommodation frame 300 is pivotably disposed on the elevating frame 200 and slidably connected to the main frame 100. Specifically, in this embodiment, the elevating mechanism 1 may further include a shaft 620, and the accommodation frame 300 may have at least one second guide portion 303 and at least one recess 305, the shaft 620 is rotatably disposed through the elevating frame 200, and two opposite ends of the shaft 620 are fixed to the accommodation frame 300; in other words, the accommodation frame 300 is rotatably disposed on the elevating frame 200 via the shaft 620. The shaft 620 has an extension direction substantially perpendicular to the extension direction of the guide rod 610; in other words, the rotation axis of the accommodation frame 300 is substantially perpendicular to the movable direction of the elevating frame 200. The second guide portions 303 are, for example, protrusions respectively protruding outward from two opposite sides of the accommodation frame 300 and slidably located at the first guide portions 103 of the main frame 100, such that the accommodation frame 300 is able to slide along the straight portion 1031 and the non-straight portion 1032 of the first guide portion 103. The guide rods 610 being disposed through the elevating frame 200 are also disposed through the recesses 305 of the accommodation frame 300, ensuring that the sliding motion of the accommodation frame 300 along with the elevating frame 200 and the pivoting motion of the accommodation frame 300 with respect to the elevating frame 200 do not interfere with the guide rods 610 before it reaches the inclined position.

In addition, in order to maintain the accommodation frame 300 in a vertical position during the slidable status of the elevating frame 200 (i.e., before the stopped status) while allowing it to be pivoted to an inclined position when the elevating frame 200 reaches the stopped status, in this embodiment, the accommodation frame 300 may further have at least one protruding portion 307, and the main frame 100 may further have at least one notch 105. Specifically, each of the protruding portions 307 is, for example, a thin plate portion protruding toward the main frame 100 from the accommodation frame 300 and can contact the main frame 100 during the slidable status of the elevating frame 200. In more detail, each of the protruding portions 307 may have a contact surface 3071 and a sloping surface 3072, the contact surface 3071 is the most protruding part of the protruding portion 307, the contact surface 3071 has a planar surface, a curved surface, or consisting of a plurality of separated planar or curved surfaces with a suitable length and width, such that the contact surface 3071 is able to contact or press against the inner surface 101 of the main frame 100 during the slidable status of the elevating frame 200 so as to maintain the accommodation frame 300 in a position parallel to the inner surface 101. The sloping surface 3072 is a ramp joining the contact surface 3071. The notches 105 are formed on the inner surface 101 of the main frame 100 and extend inward from an edge of the main frame 100, the notches 105 each have an extension direction substantially parallel to the movable direction of the elevating frame 200, and the notches 105 each have a length that is enough to let the protruding portions 307 of the accommodation frame 300 leave the inner surface 101 of the main frame 100 as the elevating frame 200 reaches the stopped status. Thus, when the protruding portions 307 are located at the notches 105, the accommodation frame 300 is not limited by the inner surface 101 of the main frame 100 and is allowed to pivot to the inclined position.

Herein, to automatically switch the accommodation frame 300 to the inclined position, in this embodiment, the elevating mechanism 1 may further include at least one second elastic component 720. Specifically, each of the second elastic components 720 may be, but not limited to, a torsion spring, the second elastic components 720 are sleeved on the shaft 620 and connected between the accommodation frame 300 and the elevating frame 200 so as to constantly force the accommodation frame 300 to move toward the inclined position. As such, when the elevating frame 200 reaches the stopped status and the accommodation frame 300 is not limited by the main frame 100, the second elastic components 720 automatically force the accommodation frame 300 to move to the inclined position. In addition, to stop the accommodation frame 300 at a specific angle, in this embodiment, each of the recesses 305 has an inclined surface 3051. Specifically, the inclined surface 3051 forms one side of the recess 305, before the elevating frame 200 reaches the stopped status, the inclined surface 3051 is at an angle to the guide rod 610, such that the inclined surface 3051 is able to stop the accommodation frame 300 at the inclined position with an angle to the main frame 100.

Then, please refer to FIGS. 3A-5C, the detail operation of the elevating mechanism 1 is given below. Firstly, FIGS. 3A-3B are partially enlarged cross-sectional views of the elevating mechanism 1, taken from different cross-sections, as the elevating frame 200 is just released from the engaged status. The user can release the elevating frame 200 by pushing down the top surface 301 of the accommodation frame 300, as discussed, the accommodation frame 300 moves the elevating frame 200 further toward the latching device 400 so that the latching device 400 releases the elevating frame 200, at this moment, the first elastic components 710 push the elevating frame 200 upward so that the elevating frame 200 is switched to the slidable status from the engaged status, and the accommodation frame 300 is moved upward by the elevating frame 200 (as the direction indicated by the arrow).

During the slidable status, as shown in FIG. 3A, the contact surface 3071 of the protruding portion 307 of the accommodation frame 300 contacts the inner surface 101 of the main frame 100 so that the accommodation frame 300 is kept in a position parallel to the inner surface 101. Meanwhile, as shown in FIG. 3B, the second guide portion 303 of the accommodation frame 300 slides along the straight portion 1031 of the first guide portion 103 of the main frame 100.

Then, FIGS. 4A-4C are partially enlarged cross-sectional views of the elevating mechanism 1, taken from different cross-sections, as the elevating frame 200 reaches the stopped status. In FIG. 4A, the elevating frame 200 pushes the accommodation frame 300 up to a position that the contact surface 3071 of the protruding portion 307 leaves the inner surface 101 of the main frame 100, at this moment, the accommodation frame 300 is still in vertical position and about to be pivoted by the second elastic component 720. Meanwhile, in FIG. 4B, the second guide portion 303 of the accommodation frame 300 is at the joint (e.g., the outer transitional surface R1) between the straight portion 1031 and the non-straight portion 1032; in FIG. 4C, the inclined surface 3051 of the recess 305 is still at an angle to the guide rod 610.

Then, FIGS. 5A-5C are partially enlarged cross-sectional views of the elevating mechanism 1, taken from different cross-sections, when the elevating frame 200 is in the stopped status and the accommodation frame 300 is switched to the inclined position. In FIG. 5A, the second elastic component 720 forces the accommodation frame 300 to pivot toward the inclined position (as the direction indicated by the arrow), during this movement, the protruding portion 307 of the accommodation frame 300 is in the notch 105 of the main frame 100 so that the main frame 100 does not stop the accommodation frame 300 from pivoting. Meanwhile, in FIG. 5B, the second guide portion 303 of the accommodation frame 300 smoothly enters into the non-straight portion 1032 along the outer transitional surface R1; in FIG. 5C, the inclined surface 3051 of the recess 305 of the accommodation frame 300 is moved to contact the guide rod 610 so as to stop the accommodation frame 300 at the inclined position. As shown, when the accommodation frame 300 is in the inclined position, the second guide portion 303 of the accommodation frame 300 is located at the non-straight portion 1032 and the accommodation frame 300 is inclined with respect to the main frame 100.

As discussed, the elevation and rotation of the accommodation frame 300 are automatically performed once the user pushes the top surface 301 of the elevating mechanism 1, thus the operation is easy and convenient. Herein, referring to FIG. 6, there is shown a perspective view of the electronic device 9 when the elevating mechanism 1 is in the status as shown in FIG. 5A. As shown, the accommodation frame 300 and the function unit F therein are popped out from the opening 911 of the casing 91 and are at a predetermined angle θ to, for example, the movable direction of the elevating frame 200 or the straight portion 1031 of the main frame 100. In one embodiment, the angle θ is approximately 13 degrees. In short, with the help of the elevating mechanism 1, the function unit F can be popped up and leaned forward to a fixed angle.

Note that the travel distance and the pivoting angle of the accommodation frame 300 caused by the elevating mechanism 1 may be modified as required. For example, in the application that the function unit F is a video camera module, the ascent and pivoting angle of the accommodation frame 300 shall consider to ensure that the lens can actually be elevated to a position that is not only located above the casing 91 but also not having the vision being covered by the casing 91.

In addition, since the elevating mechanism 1 rotates the function unit F to a predetermined inclined angle when the function unit F is in use, the lens and circuit board of the function unit F are allowed to be arranged in a vertical manner, such that an internal space of the accommodation frame 300 can be largely spared for other components.

Figure 6:
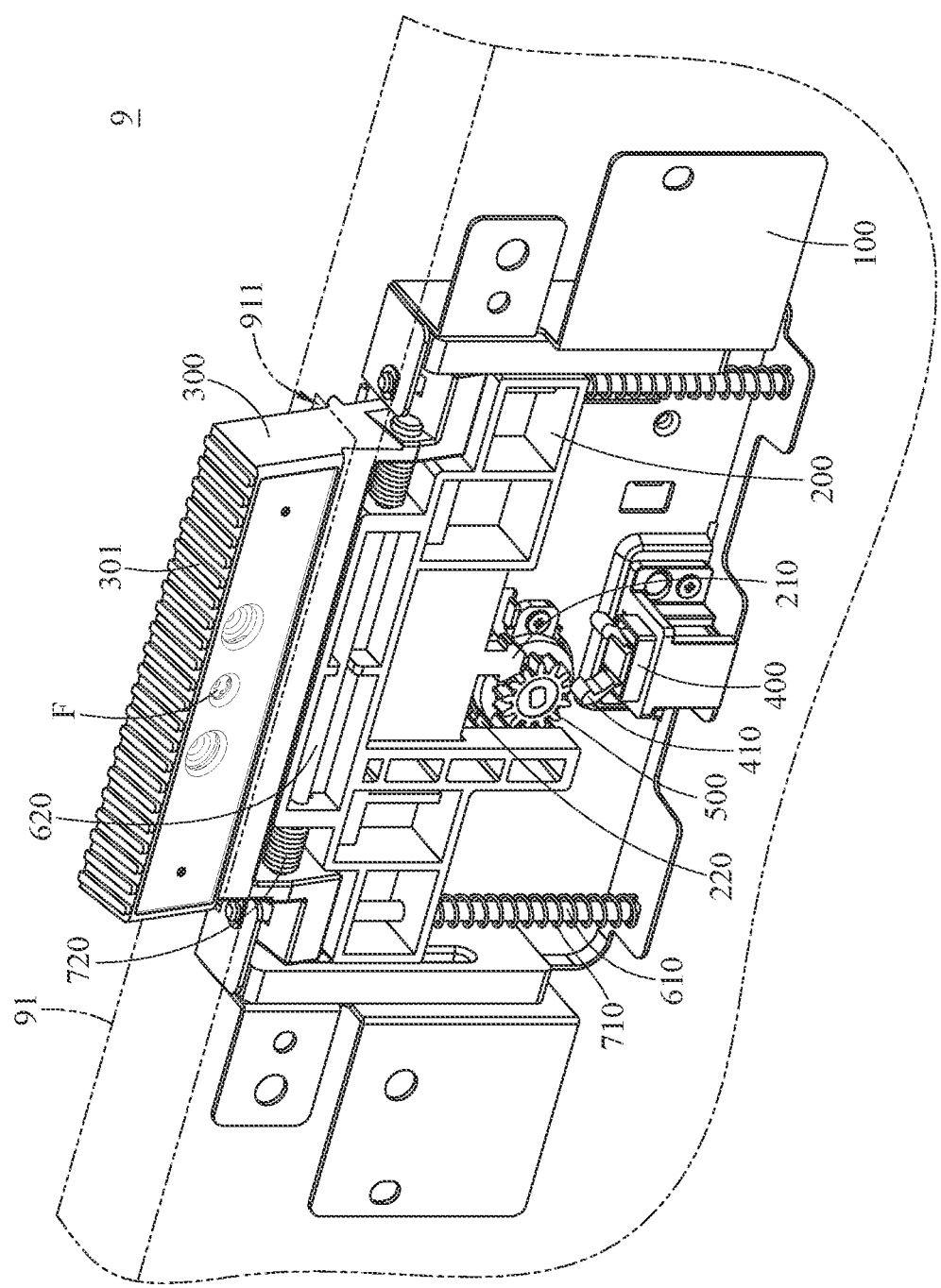
FIG. 6 is a partially enlarged perspective view of the electronic device when the elevating mechanism is in the status shown in FIG. 5A.

Furthermore, referring to FIGS. 1A, 1B, and 6, when the elevating mechanism 1 pops up the function unit F, the protrusion 230 of the elevating frame 200 leaves the switch SW, and the switch SW can respond to this change and send a corresponding signal to the predetermined receiver (not shown).

On the other hand, with the above configuration of the elevating mechanism 1, the elevating mechanism 1 can be switched back to the status as shown in FIG. 1A by simply pushing the accommodation frame 300 back into the casing 91. During this process, as shown in FIG. 5B, the second guide portion 303 of the accommodation frame 300 can be forced to slide back to the straight portion 1031 from the non-straight portion 1032 along the inner transitional surface R2. The inner transitional surface R2 has a suitable and mild curvature to ensure that the accommodation frame 300 can be smoothly switched to the vertical position. And then the elevating frame 200 will be engaged with the latching device 400 by being moved by the accommodation frame 300. As discussed, the operation of hiding the function unit F can be completed by one simple step, which is convenient and easy to use.

Lastly, the components of the elevating mechanism all may be modified as required as long as it can pop up and rotates the function unit to a predetermined angle. For example, an elevating mechanism of another embodiment may omit the torsion spring; in such a case, the compression spring and the guide groove of the main frame are still able to move the accommodation frame to the required position.

Alternatively, in some other embodiments, the quantities of the torsion spring and the compression spring may be changed as required. Alternatively, in one embodiment, the accommodation frame may further have a counterweight block therein to change the center of gravity thereof so as to help the rotation of the accommodation frame.

According to the elevating mechanism and the electronic device as discussed in the above embodiments of the disclosure, the elevating frame is slidable with respect to the main frame and the accommodation frame is pivotable to a specific angle with respect to the main frame during the elevation of the elevating frame, thus when the elevating mechanism is applied to a screen of TV, computer, tablet, or mobile phone, the elevating mechanism achieves a pop-up camera function so that the camera is allowed to be arranged behind or under the screen. As such, the function unit (e.g., lens module) can be elevated and directed to a specific angle or hidden behind the screen. And since the lens module is moved behind the screen, there is no need to accommodate the lens module in the front bezel so the front bezel can be extremely narrowed to achieve a high screen-to-body ratio as possible, thereby creating a nearly edge-to-edge front screen display while offering a convenient and automatic operation.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An elevating mechanism, adapted to accommodate a function unit, comprising:
    a main frame, having at least one first guide portion, wherein the at least one first guide portion comprises a straight portion and a non-straight portion connected to each other;
    an elevating frame, movably disposed on the main frame, wherein a movable direction of the elevating frame is substantially parallel to the straight portion; and
    an accommodation frame, configured to accommodate the function unit, wherein the accommodation frame is pivotably connected to the elevating frame and has at least one second guide portion slidably located at the at least one first guide portion to make the accommodation frame movable between a non-inclined position and an inclined position;
    when the accommodation frame is in the non-inclined position, the at least one second guide portion is located at the straight portion of the at least one first guide portion; when the accommodation frame is in the inclined position, the at least one second guide portion is located at the non-straight portion of the at least one first guide portion and the accommodation frame is inclined with respect to the main frame.

2. The elevating mechanism according to claim 1, further comprising at least one first elastic component connected between the main frame and the elevating frame and configured to force the elevating frame to move the at least one second guide portion of the accommodation frame to the inclined position from the non-inclined position along the straight portion.

3. The elevating mechanism according to claim 1, further comprising at least one second elastic component connected between the elevating frame and the accommodation frame and configured to force the at least one second guide portion of the accommodation frame to move along the non-straight portion so as to pivot the accommodation frame toward the inclined position from the non-inclined position with respect to the main frame.

4. The elevating mechanism according to claim 1, further comprising at least one guide rod disposed on the main frame and disposed through the elevating frame, and the at least one guide rod is substantially parallel to the straight portion.

5. The elevating mechanism according to claim 1, wherein the accommodation frame has at least one protruding portion protruding toward the main frame from the accommodation frame, the at least one protruding portion is configured to contact an inner surface of the main frame so as to prevent the accommodation frame from pivoting with respect to the elevating frame.

6. The elevating mechanism according to claim 5, wherein the at least one protruding portion has a contact surface configured to contact the inner surface of the main frame, and the contact surface has at least one planar surface.

7. The elevating mechanism according to claim 5, wherein the main frame has at least one notch formed on the inner surface of the main frame, when the at least one second guide portion of the accommodation frame reaches the non-straight portion of the at least one first guide portion, the at least one protruding portion leaves the inner surface of the main frame and is located at the at least one notch so as to allow the accommodation frame to pivot toward the inclined position from the non-inclined position with respect to the main frame.

8. The elevating mechanism according to claim 1, further comprising a damper disposed on the main frame, wherein the elevating frame has a gear rack portion engaged with the damper.

9. The elevating mechanism according to claim 1, further comprising a latching device disposed on the main frame, wherein the elevating frame has a push pin removably inserted into the latching device, when the push pin is inserted into the latching device, the elevating frame is secured in an engaged status.

10. The elevating mechanism according to claim 1, further comprising a switch disposed on the main frame, wherein the main frame has a through hole exposing the switch, the elevating frame has a protrusion slidably located at the through hole, when the accommodation frame is in the non-inclined position, the protrusion activates the switch.

11. An electronic device, comprising:
    a casing;
    an elevating mechanism, accommodated in the casing, comprising:
        a main frame, fixed to the casing and having at least one first guide portion, wherein the at least one first guide portion comprises a straight portion and a non-straight portion connected to each other;
        an elevating frame, movably disposed on the main frame, wherein a movable direction of the elevating frame is substantially parallel to the straight portion; and
        an accommodation frame, pivotably connected to the elevating frame and having at least one second guide portion, wherein the at least one second guide portion is slidably located at the at least one first guide portion to make the accommodation frame movable between a non-inclined position and an inclined position, when the accommodation frame is in the non-inclined position, the at least one second guide portion is located at the straight portion of the at least one first guide portion, when the accommodation frame is in the inclined position, the at least one second guide portion is located at the non-straight portion of the at least one first guide portion and the accommodation frame is inclined with respect to the main frame; and a function unit, accommodated in the accommodation frame.

12. The electronic device according to claim 11, wherein the elevating mechanism further comprises at least one first elastic component connected between the main frame and the elevating frame and configured to force the elevating frame to move the at least one second guide portion of the accommodation frame toward the inclined position from the non-inclined position along the straight portion so as to move at least part of the accommodation frame out of an opening of the casing.

13. The electronic device according to claim 11, wherein the elevating mechanism further comprises at least one second elastic component connected between the elevating frame and the accommodation frame and configured to force the at least one second guide portion of the accommodation frame to move along the non-straight portion so as to pivot the accommodation frame toward the inclined position from the non-inclined position with respect to the main frame.

14. The electronic device according to claim 11, wherein the elevating mechanism further comprises at least one guide rod disposed on the main frame and disposed through the elevating frame, and the at least one guide rod is substantially parallel to the straight portion.

15. The electronic device according to claim 11, wherein the accommodation frame has at least one protruding portion protruding toward the main frame from the accommodation frame, the at least one protruding portion is configured to contact an inner surface of the main frame so as to prevent the accommodation frame from pivoting with respect to the elevating frame.

16. The electronic device according to claim 15, wherein the at least one protruding portion has a contact surface configured to contact the inner surface of the main frame, and the contact surface has at least one planar surface.

17. The electronic device according to claim 15, wherein the main frame has at least one notch formed on the inner surface of the main frame, when the at least one second guide portion of the accommodation frame reaches the non-straight portion of the at least one first guide portion, the at least one protruding portion leaves the inner surface of the main frame and is located at the at least one notch so as to allow the accommodation frame to pivot toward the inclined position from the non-inclined position with respect to the main frame.

18. The electronic device according to claim 11, wherein the elevating mechanism further comprises a damper disposed on the main frame, and the elevating frame has a gear rack portion engaged with the damper.

19. The electronic device according to claim 11, wherein the elevating mechanism further comprises a latching device disposed on the main frame, the elevating frame has a push pin removably inserted into the latching device, when the push pin is inserted into the latching device, the elevating frame is secured in an engaged status.

20. The electronic device according to claim 11, wherein the elevating mechanism further comprises a switch disposed on the main frame, the main frame has a through hole exposing the switch, the elevating frame has a protrusion slidably located at the through hole, when the accommodation frame is in the non-inclined position, the protrusion activates the switch.

* * * * *